Patented July 7, 1953

UNITED STATES PATENT OFFICE 2,644,822

2,3-BIS-(OXYBENZYL)-BUTANE DERIVATIVES

Irwin A. Pearl, Appleton, Wis., assignor, by mesne assignments, to Sulphite Products Corporation, Appleton, Wis., a corporation of Wisconsin No Drawing. Application August 26, 1949, Serial No. 112,638

7 Claims. (Cl. 260—340.9)

The present invention relates to improved processes of preparing 2,3-bis-(hydroxybenzyl)-2,3-butanediols and 2,3-bis-(hydroxybenzyl)-butanes and related oxybenzyl (hydroxy, alkyloxy, aryloxy, aralkyloxy, acyloxy) compounds, and to the novel products produced by the process of the present invention.

The product 2,3-bis-(3,4-dihydroxybenzyl)-butane, i. e. nordihydroguaiaretic acid or "N. D. G. A.," has been known for some time, and its antioxidant properties, particularly in the fats and oils field, have been well established. It has been prepared commercially by a complicated and tedious extraction process from plants of the species Larrea divaricata. While it has been appreciated that the extraction process was relatively expensive and far from satisfactory, prior attempts to synthesize N. D. G. A. in high yields by a commercially practical process have proven unsuccessful. See Lieberman et al., J. Am. Chem. Soc., 69, 1540 (1947).

The principal object of the present invention is to provide improved 2,3-bis-(hydroxybenzyl)-2,3-butanediols and butanes and related oxybenzyl compounds and improved processes of preparing the same.

Other objects of the present invention will be apparent as the detailed description proceeds.

I have discovered that the 2,3-bis-(oxybenzyl)-2,3-butanediols and related butanes may be readily prepared from oxybenzaldehydes. The process may be illustrated by the following formulas in which vanillin (3-methoxy-4-hydroxy benzaldehyde) is used as the oxybenzaldehyde. In the present specification and claims the prefix "oxy" refers to hydroxy and potential hydroxy groups such as alkyoxy, aryloxy, aralkyloxy, alkyleneoxy, etc.

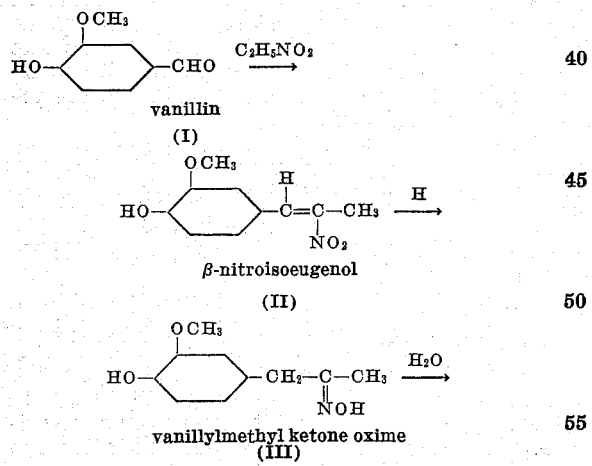

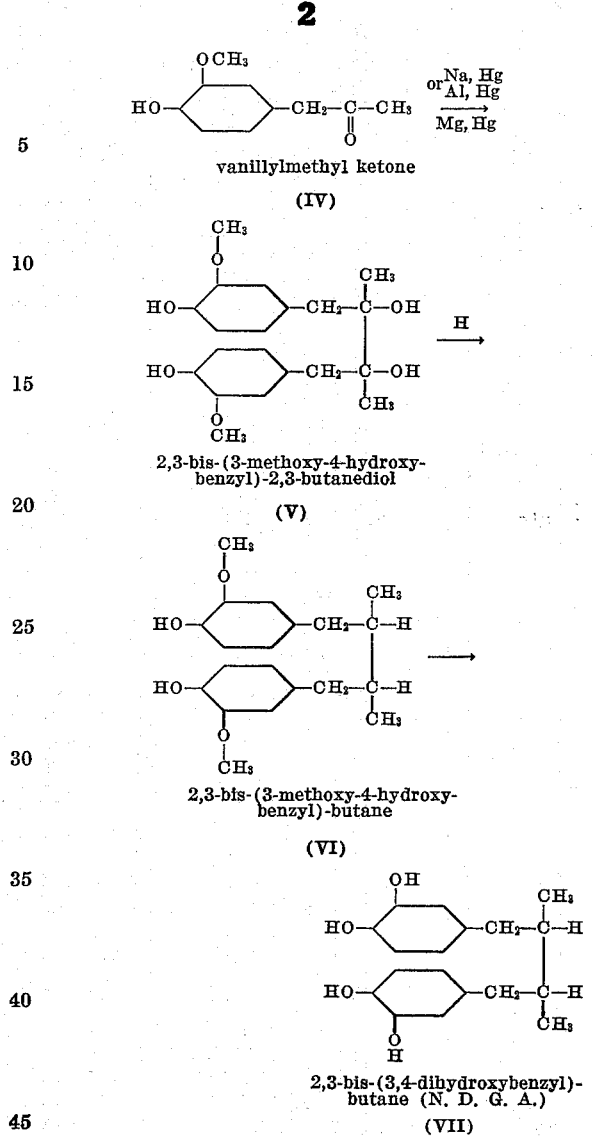

In place of vanillin (I) in the above formulas, other oxybenzaldehydes may be used to produce the corresponding butanediols and butanes. Representative examples are: 3,4-dihydroxybenzaldehyde, 3,4-dimethoxy-benzaldehyde, 3-methoxy - 4 - benzyloxy - benzaldehyde, 3,4-dibenzyloxy - benzaldehyde and 3,4-methylenedioxy-benzaldehyde (piperonal), all of which may be used to prepare 2,3-bis-(3,4-dioxybenzyl)-2,3-butanediols (V) and 2,3-bis-(3,4-dihydroxybenzyl)-butane (VII); and 3,4,5-trimethoxy-benzaldehyde, 3,4,5-tribenzyloxy-benzaldehyde, 3,5-dimethoxy-4-benzyloxy-benzaldehyde and 3,5-dimethoxy-4-hydroxy-benzaldehyde, all of which may be used to prepare 2,3-bis-(3,4,5-trioxybenzyl)-2,3-butanediols and 2,3-bis-(3,4,5-trihydroxybenzyl)-butane. The benzaldehydes used in the present invention have a hydroxy group or a potential hydroxy (oxy) group at the 4- position (para to the aldehyde group) and at least another hydroxy or potential hydroxy group at the 3- position. The trisubstituted benzaldehydes used in the present invention have oxy or potential hydroxy groups at the 3, 4 and 5 positions.

The following examples will serve to illustrate the present invention.

EXAMPLE I

NORDIHYDROGUAIARETIC ACID (VII)

β-Nitroisoeugenol (II)

Step A.—A solution of 250 grams of vanillin (I) in 900 cc. of 95 per cent ethanol at 20° C. is treated successively with stirring with 150 cc. of nitroethane, 10 grams of methylamine hydrochloride, and 8 grams of sodium carbonate. Stirring is preferably continued for 1 to 2 hours and the mixture then allowed to stand for about two weeks in the dark. The crystalline precipitate which forms on standing is separated by filtration and the filtrate stirred into 7 liters of water. The solid material which precipitates in the water is separated by filtration and after combining with the first precipitate is washed well with water and then air dried. The dried product is next dissolved in a minimum amount of methanol, filtered, and the resulting filtrate diluted with water to yield yellow translucent crystals melting at 99–100° C. Repetition of the methanol-water purification gives pure crystals of the desired β-nitroisoeugenol melting at about 100–101° C.

Vanillylmethyl ketone (IV)

Step B.—About 100 cc. of ethanol and 110 grams of β-nitroisoeugenol (II) are placed in a 5-liter 3-neck flask equipped with a mechanical stirrer and reflux condenser. The mixture is heated with stirring and when the nitroisoeugenol is dissolved, 2500 cc. of hot water is added. With heating and vigorous stirring 200 grams of iron powder and 8 grams of hydrated ferric chloride are next added with continued stirring, followed by the addition of 100 cc. of concentrated hydrochloric acid. As the hydrochloric acid causes a violent reaction, it is added slowly to the reaction mixture. After the vigorous reaction subsides, the mixture is boiled with stirring under reflux for about two hours and then allowed to cool. The reaction mixture is next distilled under reduced pressure until approximately 2 liters of distillate is obtained. The residue is filtered and the fluffy iron oxide washed well with hot water and then with ether. The combined filtrate and washings are acidified strongly with hydrochloric acid and extracted with ether, the ether extract dried and the ether distilled. The oil residue obtained after the removal of the ether is fractionated under reduced pressure to yield pure vanillylmethyl ketone as a light yellow viscous oil boiling at 126–127° C. at 0.3 mm. and having a refractive index of $n_D^{22}$ 1.5481. In this reaction the β-nitroisoeugenol (II) is reduced to the oxime (III) which in turn is hydrolyzed directly to the desired (IV) in the same reaction mixture.

2,3-bis(3-methoxy-4-hydroxybenzyl)-2,3-butanediol (V)

Step C.—A sodium amalgam is first prepared by adding 6 grams of sodium metal in small pieces below the surface of 400 grams of mercury. The amalgam is cooled and covered with a solution of 22 grams of vanillylmethyl ketone (IV) and 6 grams of sodium hydroxide in 250 cc. of water. The mixture is warmed to 33° C. and stirred with a glass stirrer for about six hours. The solution is decanted from the mercury, and the mercury washed with 3 volumes of water. The combined alkaline solutions are then saturated with carbon dioxide and extracted with ether. The ether extract is dried and and the ether distilled leaving a very viscous oil which is distilled under reduced pressure to give the desired product (V) as a very light yellow viscous oil boiling at 140° C./1.5 mm. $n_D^{25}$ 1.5548.

2,3-bis-(3,4-dihydroxybenzyl)-2,3-butanediol

Step D.—About 30 grams of 2,3-bis-(3-methoxy - 4 - hydroxybenzyl)-2,3-butanediol (V) is added to a solution of 60 grams of potassium hydroxide in 240 cc. of ethylene glycol and the resulting mixture heated to approximately 200° C. for 18 hours under a nitrogen atmosphere. The reaction mixture is then cooled and acidified with 200 cc. of hydrochloric acid. The acidified reaction mixture is then diluted with water and the desired 2,3-bis-(3,4-dihydroxybenzyl)-2,3-butanediol which precipitates is separated from the solution by filtration.

2,3-bis-(3,4-dihydroxybenzyl)-butane (VII)

Step E.—About 35 grams of 2,3-bis-(3,4-dihydroxybenzyl)-2,3-butanediol is boiled under reflux for about 20 minutes with a mixture of 100 cc. of acetic anhydride and 60 cc. of acetyl chloride. The reaction mixture is cooled and poured with stirring into an excess of crushed ice and water and then allowed to stand a short while with frequent shaking. The solid 2,3-bis-(3,4-diacetoxybenzyl)-1,3-butadiene which separates is saponified by heating with an excess of dilute sodium hydroxide solution and after cooling saturated with carbon dioxide. The resulting precipitate 2,3-bis-(3,4 - dihydroxybenzyl)-1,3-butadiene obtained is separated by filtration and dried. The butadiene is then dissolved in dioxane and treated with palladium charcoal catalyst and hydrogenated at 50 pounds pressure. After no more hydrogen is absorbed, the mixture is filtered and the dioxane evaporated to a small volume under reduced pressure. Upon standing white crystals of the desired butane (N. D. G. A.) melting at about 185–186.5° C. separate and are recovered by filtration.

EXAMPLE II

NORDIHYDROGUAIARETIC ACID (From benzyl vanillin)

β-nitrobenzylisoeugenol

A solution of 250 grams of benzyl vanillin in 1000 cc. of warm ethanol is cooled to room temperature and treated with 125 cc. of nitroethane, 10 grams of methylamine hydrochloride and 8 grams of sodium carbonate as described above in Step A of Example I. After one week of standing, a heavy dark oil separates and after two weeks of standing, the mixture is placed in a refrigerator. The dark oil solidifies to a dark yellow solid and a light yellow crystalline solid, both of which are separated from the solution by filtration and washed with cold ethanol. The crude product which melts at about 70–73° C. is next stirred with methanol (preferably in a "Waring" blendor), and then filtered and washed with cold methanol. Recrystallization from methanol or petroleum ether gives the desired product as yellow flakes melting at about 87–88° C.

Benzylvanillylmethyl ketone

The method employed is identical with that employed in the preparation of vanillylmethyl ketone. Reduction of 110 grams of β-nitrobenzyl isoeugenol with the iron and acid in accordance with Step B of Example I yields a crude product which is fractionated in vacuo, yielding benzylvanillylmethyl ketone as a light yellow oil boiling at 198–200° C. at 1.6 mm. and having an index of refraction of $n_D^{24}$ 1.5730. Upon scratching, the oil solidifies with the evolution of considerable heat. The desired ketone after recrystallization from dilute ethanol is obtained as white needles melting at 61° C.

2,3-bis-(3-methoxy-4-benzyloxybenzyl)-2,3-butanediol

This product is prepared in accordance with Step C of Example I by substituting benzylvanillylmethyl ketone for the vanillylmethyl ketone employed in Example I.

2,3-bis-(3-methoxy-4-hydroxybenzyl)-2,3-butanediol

Step D'.—The product 2,3-bis-(3-methoxy-4-benzyloxybenzyl)-2,3-butanediol is debenzylated by dissolving it in warm ethanol and treating the resulting solution wth hydrogen at 35–45 pounds pressure in the presence of palladium charcoal catalyst until no more hydrogen is absorbed. The catalyst is then removed by filtration and the resulting ethanol solution evaporated to a small volume. On cooling the desired product crystallizes and is separated by filtration.

2,3-bis-(3,4-dihydorxybenzyl)-2,3-butanediol

The product 2,3-bis-(3-methoxy-4-hydroxybenzyl)-2,3-butanediol is demethylated in accordance with Step D of Example I.

2,3-bis-(3,4-dihydroxybenzyl)-butane

The product 2,3-bis-(3,4-dihydroxybenzyl)-2,3-butanediol is converted into the desired butane in accordance with Step E of Example I.

EXAMPLE III

NORDIHYDROGUAIARETIC ACID (From piperonal)

β-nitroisosafrole

A mixture of 250 grams of piperonal, 500 cc. of ethanol, 150 cc. of nitroethane, 10 grams of methylamine hydrochloride and 8 grams of sodium carbonate are stirred for about 3 hours and allowed to stand at room temperature for about two weeks and then placed in a refrigerator. After one day in the refrigerator, a heavy crystalline precipitate forms which is separated by filtration, washed with cold ethanol and dried. The desired product after recrystallization from ethanol is obtained as yellow needles melting at about 97–98° C.

The β-nitroisosafrole may also be prepared by the following method which requires only a few hours as compared to the relatively long standing period employed in the above process. A mixture of 50 grams of piperonal, 30 cc. of nitroethane, 2.0 grams of ammonium acetate and 200 cc. of acetic acid is heated to boiling under gentle reflux for 3 hours and allowed to cool. The cooled solution is next poured into water and stirred for a short time. The dark crystalline precipitate which forms is filtered, washed with water, and air dried. Recrystallization from ethanol gives a dark product melting at 95–97° C. Repeated recrystallizations from ethanol and decolorizing carbon gives yellow needles of the desired pure product melting at 98° C.

Piperonylmethyl ketone

The method employed is identical with that described for the preparation of vanillylmethyl ketone. Reduction of 110 grams of β-nitroisosafrole in accordance with Step B of Example I yields a crude product which is fractionated under reduced pressure to give the desired ketone as a yellow oil having a refractive index of $n_D^{26}$ 1.5400.

2,3-bis-(3,4-methylenedioxybenzyl)-2,3-butanediol

A solution of 25 grams of piperonylmethyl ketone in 375 cc. of ethyl acetate is treated with 10 grams of magnesium turnings and 1.0 gram of mercuric chloride. Upon warming, a vigorous reaction takes place. The mixture is boiled for about one hour after the vigorous reaction subsides and is then filtered. The clear filtrate, which thickens upon standing, is concentrated to dryness under reduced pressure. The yellow solid which is obtained is covered with water, treated with an excess of dilute hydrochloric acid, and warmed on a steam bath a short while. Upon cooling, the mixture is extracted with ether. The ether is back washed with water, dried with sodium sulfate and potassium carbonate, and distilled. The residual oil is fractionated under reduced pressure to give the desired product as a viscous oil boiling at 200–205° C./0.5 mm.

2,3-bis-(3,4-dihydroxybenzyl)-2,3-butanediol

This product is prepared by subjecting 2,3-bis-(3,4-methylenedioxybenzyl)-2,3-butanediol to the demethylating reaction of Step D of Example I.

2,3-bis-(3,4-dihydroxybenzyl)-butane

The product 2,3-bis-(3,4-dihydroxybenzyl)-2,3-butanediol is converted into the desired butane in accordance with Step E of Example I.

Examples I, II and III described above illustrate procedures for producing nordihydroguaiaretic acid from three different substituted benzaldehydes. Other representative examples are as follows.

EXAMPLE IV

NORDIHYDROGUAIARETIC ACID (From veratraldehyde)

This process follows Example I except that veratraldehyde (3,4-dimethoxy-benzaldehyde) is used in place of the vanillin of Example I. The nitro compound is formed in accordance with Step A, the methylvanillylmethyl ketone in accordance with Step B and the 2,3-bis-(3,4-dimethoxybenzyl)-2,3-butanediol in accordance with Step C. Demethylation and the formation of the final butane product are carried out in accordance with Steps D and E.

EXAMPLE V

NORDIHYDROGUAIARETIC ACID
(From dibenzylether of protocatechuicaldehyde)

This process follows Example I except that the dibenzylether of protocatechuicaldehyde (3,4-dibenzyloxy-benzaldehyde, M. P. 86° C. prepared by reacting protocatechuicaldehyde with two moles of benzyl chloride and alkali) is used in place of the vanillin of Example I. The nitro compound (3,4 - dibenzyloxy - β - nitro - 1-propenylbenzene) is formed in accordance with Step A, the 3,4-dibenzyloxybenzylmethyl ketone in accordance with Step B and the 2,3-bis-(3,4-dibenzyloxybenzyl)-2,3-butanediol in accordance with Step C. Debenzylation and formation of the final butane product are carried out in accordance with Steps D' and E.

EXAMPLE VI

NORDIHYDROGUAIARETIC ACID
(From 3,4-dihydroxybenzaldehyde)

This process follows Example I except that 3,4-dihydroxy-benzaldehyde is used in place of the vanillin of Example I. The nitro compound is formed in accordance with Step A, the 3,4-dihydroxybenzylmethyl ketone in accordance with Step B and the 2,3-bis-(3,4-dihydroxybenzyl)-2,3-butanediol in accordance with Step C. This product is then converted directly to the final butane product by Step E.

The 2,3 - bis - (3,4,5 - trioxybenzyl) - butanediols and butanes may also be prepared by the processes described above. The following examples will serve to illustrate the present invention.

*2,3-bis-(3,4,5-trihydroxybenzyl)-butane*

EXAMPLE VII

This process follows Example I except that the trimethyl ether of gallaldehyde (3,4,5-trimethoxy-benzaldehyde) is used in place of the vanillin of Example I. The nitro compound (3,4,5 - trimethoxybenzyl) - β - nitro - 1 - propenylbenzene) is formed in accordance with Step B, and the 2,3-bis-(3,4,5-trimethoxybenzyl)-2,3-butanediol in accordance with Step C. Demethylation and the formation of the final butane product (2,3 - bis - (3,4,5 - trihydroxybenzyl) 2,3-butane) as a white crystalline solid are carried out in accordance with Steps D and E.

The ketone intermediate in this example may also be prepared by treating 3,4,5-trimethoxypropenylbenzene with sodium nitrite and acid and then with alcoholic alkali to form β-nitroisoelemicin. This nitro product is then reduced and hydrolyzed by iron and acid (Step B) to form the 3,4,5-trimethoxybenzylmethyl ketone.

EXAMPLE VIII

This process follows Example I except that the tribenzyl ether of gallaldehyde (3,4,5-tribenzyloxybenzaldehyde) is used in place of the vanillin of Example I. The nitro compound (3,4,5-tribenzyloxy-β-nitro-1-propenylbenzene) is formed in accordance with Step A, the 3,4,5-tribenzyloxybenzylmethyl ketone in accordance with Step B, and the 2,3-bis-(3,4,5-tribenzyloxybenzyl)-2,3-butanediol in accordance with Step C. Debenzylation and formation of the final butane product are carried out in accordance with Steps D' and E.

EXAMPLE IX

This process follows Example I except that syringaldehyde (3,5 - dimethoxy - 4 - hydroxybenzaldehyde) is used in place of the vanillin of Example I. The nitro compound is formed in accordance with Step A, the 3,5-dimethoxy-4-hydroxy-benzylmethyl ketone in accordance with Step B, and the 2,3-bis-(3,5-dimethoxy - 4 - hydroxybenzyl)-2,3-butanediol in accordance with Step C. Demethylation and the formation of the final butane product are carried out in accordance with Steps D and E.

EXAMPLE X

This process follows Example I except that 3,5-dimethoxy-4-benzyloxy-benzaldehyde is used in place of the vanillin of Example I. The nitro compound (3,5-dimethoxy-4-benzyloxybenzyl-β-nitropropenylbenzene) is formed in accordance with Step A, the 3,5 - dimethoxy - 4 - benzyloxybenzylmethyl ketone in accordance with Step B, and the 2,3-bis-(3,5-dimethoxy - 4 - benzyloxy) -2,3-butanediol in accordance with Step C. This product is debenzylated in accordance with Step D' and then demethylated in accordance with Step D and the final butane product prepared in accordance with Step E.

EXAMPLE XI

NORDIHYDROGUAIARETIC ACID

The 2,3-bis-(3,4 - methylenedioxybenzyl) - 2,3-butanediol of Example III may be converted to the butane (N. D. G. A.) by the following method. A mixture of 35 grams of the methylenedioxy compound, 150 cc. of toluene and 140 grams of phosphorus pentachloride is heated to boiling under reflux for about 3 hours and then cooled and poured slowly with stirring into 3 liters of a mixture of saturated sodium carbonate and ice. The white precipitate which forms is recovered by filtration, washed with cold water and dried in vacuo. The resulting product 2,3 - bis - (3,4 - dichloromethylenedioxybenzyl) - 3-chloro-1-butene is refluxed for about 3 hours with an excess of N hydrochloric acid in 80 per cent methanol. The solvent is next removed under reduced pressure and the residue treated with a 5 per cent sodium hydroxide-3 per cent sodium hydrosulfite solution. Acidification of this mixture yields 2,3-bis- (3,4 - dihydroxybenzyl)-3-chloro - 1 - butene which is hydrogenated at 50 pounds pressure over palladium charcoal to yield the desired N. D. G. A. as a white crystalline solid with a melting point of about 185–186.5° C.

The conversion of the aldehyde (I) to the nitro compound (II) has been designated Step A, and the conversion of the nitro compound to the ketone (IV) has been designated Step B, as the reduction of the nitro compound to the oxime (III) and the hydrolysis of the oxime to the ketone is carried out in the same acidic reaction mixture. The conversion of the ketone to the butanediol (V) has been designated Step C. The demethylation of the butanediols or pinacols has been designated Step D, and the debenzylation Step D'. The conversion of the butanediols to the butanes has been designated Step E.

Treatment of pinacols containing alkoxy groups with acetic anhydride and acetyl chloride as in Step E yields the corresponding butadienes without saponification. Removal of the alkyl groups by Step D as described above should be performed on the completely reduced compound after hydrogenation. The 2,3-bis-(3,4-methylenedioxybenzyl)-butane is converted to the 3,4-dihydroxy product by treatment with phosphorus pentachloride to form the 2,3-bis-(3,4-dichloromethylenedioxybenzyl)-butane which in turn is converted to the 3,4-dihydroxy product by treatment with a mixture of hydrochloric acid and methanol as in Example XI. The dibenzyloxy pinacol after treatment with acetic anhydride and acetyl chloride yields the desired N. D. G. A. directly upon hydrogenation.

It will be apparent to those skilled in the art that acid demethylating agents such as hydriodic acid, hydrobromic acid, aniline hydrochloride, etc., cannot be used for demethylating the butanediols when the diol is desired, because these agents have a halogenating or dehydrating effect upon the glycol structure. However, these effects are of no consequence if the completely reduced butane compound such as N. D. G. A. are desired. With the acid agents, however, there is a tendency for the pinacoline rearrangement to take place and yield unwanted ketone products. It will also be obvious to those skilled in the art that as the compounds contain two asymmetric carbon atoms they may be resolved into their optically active forms by procedures well known in the art.

The butane derivatives of the present invention are effective anti-oxidants for edible fats and oils and retain their efficiency when incorporated with other products. They also are substantially colorless and are non-toxic in the concentrations used. While the butanediols per se may be employed, the butane compound of Example VII containing three hydroxyl groups possesses particularly potent properties of the type desired.

I claim:

1. The product 2,3-bis-[(RO)$_n$-benzyl]-2,3-butanediol where $n$ is an integer consisting of 2 or 3, the RO substituent appearing on the 3 and 4 positions of the benzyl group when $n$ is 2, and on the 3, 4, and 5 positions of the benzyl group when $n$ is 3, and R is at least one radical selected from the group consisting of hydrogen, alkyl, aryl, ararkyl, and alkylene radicals.

2. The product 2,3-bis-(3-methoxy-4-hydroxybenzyl)-2,3-butanediol.

3. The product 2,3 - bis - (3,4,5 - trimethoxybenzyl)-2,3-butanediol.

4. The product 2,3-bis-(3,4-methylenedioxybenzyl)-2,3-butanediol.

5. 2,3 - bis - (3,4 - dibenzyloxybenzyl) - 2,3-butanediol.

6. 2,3 - bis - (3,5 - dimethoxy - 4 - hydroxybenzyl)-2,3-butanediol.

7. The product 2,3-bis-((OH)$_n$-benzyl)-2,3-butanediol where $n$ is an integer consisting of 2 or 3, the OH substituent appearing on the 3 and 4 positions of the benzyl group when $n$ is 2 and on the 3, 4, and 5 positions of the benzyl group when $n$ is 3.

IRWIN A. PEARL.

References Cited in the file of this patent

UNITED STATES PATENTS

| Number | Name | Date |
|---|---|---|
| 2,427,822 | Tindall | Sept. 23, 1947 |
| 2,456,443 | Mueller et al. | Dec. 14, 1948 |
| 2,483,201 | Hurd | Sept. 27, 1949 |

OTHER REFERENCES

Campbell et al., Proceedings Royal Soc. of London, p. 256, Series 23, vol. 128 (1940).

Haas, Ind. and Eng. Chem., vol. 35, p. 1151 (Nov. 1943).